(12) United States Patent
Oon et al.

(10) Patent No.: US 7,526,126 B2
(45) Date of Patent: Apr. 28, 2009

(54) COLOR DUPLICATION METHOD AND APPARATUS

(75) Inventors: Chin Hin Oon, Penang (MY); Selvan Maniam, Penang (MY); Yoke Peng Boay, Penang (MY); Kean Loo Keh, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 886 days.

(21) Appl. No.: 10/897,879

(22) Filed: Jul. 22, 2004

(65) Prior Publication Data

US 2006/0018535 A1    Jan. 26, 2006

(51) Int. Cl.
*G06K 9/00* (2006.01)
(52) U.S. Cl. ................................. 382/167; 382/162
(58) Field of Classification Search ............... 382/162, 382/167, 312, 318, 319; 358/509, 512, 518; 702/104; 250/208.1, 559.1
See application file for complete search history.

(56) References Cited

U.S. PATENT DOCUMENTS

| | | | |
|---|---|---|---|
| 6,459,076 B1 | 10/2002 | Schlenker | |
| 6,552,829 B1* | 4/2003 | Maciey et al. | ............... 358/509 |
| 6,571,189 B2* | 5/2003 | Jensen et al. | ................ 702/104 |
| 2001/0028227 A1 | 10/2001 | Lys et al. | |
| 2002/0135763 A1 | 9/2002 | MacKinnon et al. | |
| 2003/0214510 A1 | 11/2003 | Tajima | |

FOREIGN PATENT DOCUMENTS

WO    WO 01/14856    3/2001

OTHER PUBLICATIONS

ZDNET AnchorDesk ("E-Paper Here Sooner Than You Think," Published on Tuesday, Nov. 21, 2000, pp. 1-2.).*
Crawford ("A bright new page in portable displays," IEEE Spectrum, vol. 37, Issue 10, Published on Oct. 2000, pp. 40-46.).*

* cited by examiner

*Primary Examiner*—Duy M Dang

(57) ABSTRACT

Method and apparatus for duplicating a target color and changing a color of an object to match the target color. A first color sensor measures the target color. A color projection mechanism selectively changes the color of the object. A color matching mechanism is coupled to the first color sensor for receiving the target color. Based on the target color, the color matching mechanism controls the color projection mechanism to change the color of the object to match the target color.

10 Claims, 5 Drawing Sheets

COLOR DUPLICATION METHOD AND APPARATUS

BACKGROUND OF THE INVENTION

It has been said that color exists only in the eye of the beholder. The human eye interprets certain wavelengths has having a "color." There have been many efforts to "read" color. For example, devices (e.g., cameras) have been developed to capture light and reproduce the light as color images on film or other medium.

Similarly, there have been many efforts to "create" color. For example, the television or a computer monitor creates color by using a cathode ray tube (CRT) that uses the three primary colors: red, green, and blue. For example, the television or computer monitor reproduces a picture or movie by using these colors.

Unfortunately, there has so far been no effort to recreate color.

It would be desirable for certain objects to blend into its surroundings.

For the fashion industry, a piece of clothing that can change colors would revolutionize the design of clothing and accessories. One could image the ability to coordinate clothing and accessories to either match or contrast with the surroundings. One could imagine a piece of clothing that can change colors to match a particular surrounding and the colors in that particular environment. One can also imagine coordinating the color the clothing and the accessories to match or contrast with each other. The flexibility and variety that would make the current one-color clothing or accessory seem very drab indeed.

For children, a toy can be designed that can change its color, thereby adding variety and interest to play time. A toy that can change colors can maintain the curiosity of the child for a longer period of time and also create visual interest that can increase the visual development, especially of infants.

For the arts and crafts industry, one can imagine interesting crafts and art projects that can change colors. For example, one can imagine decorative projects that change its color that add decorative and artist interest.

For the home improvement industry, one can imagine tools that can simulate changes. For example, decorating a room or even testing out a particular color paint would be greatly simplified if a device that could be mounted onto a wall changes colors to match a particular swatch or provide an appropriate contrast.

Based on the foregoing, there remains a need for a color duplication method and apparatus that overcomes the disadvantages set forth previously.

SUMMARY OF THE INVENTION

According to one embodiment of the present invention, a method and apparatus for duplicating a target color and changing a color of an object to match the target color is described. A first color sensor measures the target color. A color projection mechanism selectively changes the color of the object. A color matching mechanism is coupled to the first color sensor for receiving the target color. Based on the target color, the color matching mechanism controls the color projection mechanism to change the color of the object to match the target color.

According to another embodiment of the present invention, a method and apparatus for duplicating a target color and changing a color of an object to match the target color is described. A first color sensor measures the target color. A color projection mechanism selectively changes the color of the object. A second color sensor measures the color generated by the color projection mechanism. A color matching mechanism is coupled to the first color sensor for receiving the target color and is coupled to the second color sensor for receiving the measured color. Based on these inputs, the color matching mechanism controls the color projection mechanism to change the color of the object to match the target color.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Method and apparatus for duplicating a target color and changing a color of an object to match the target color are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Color Duplication that Does Not Utilize Feedback

Figure 1:
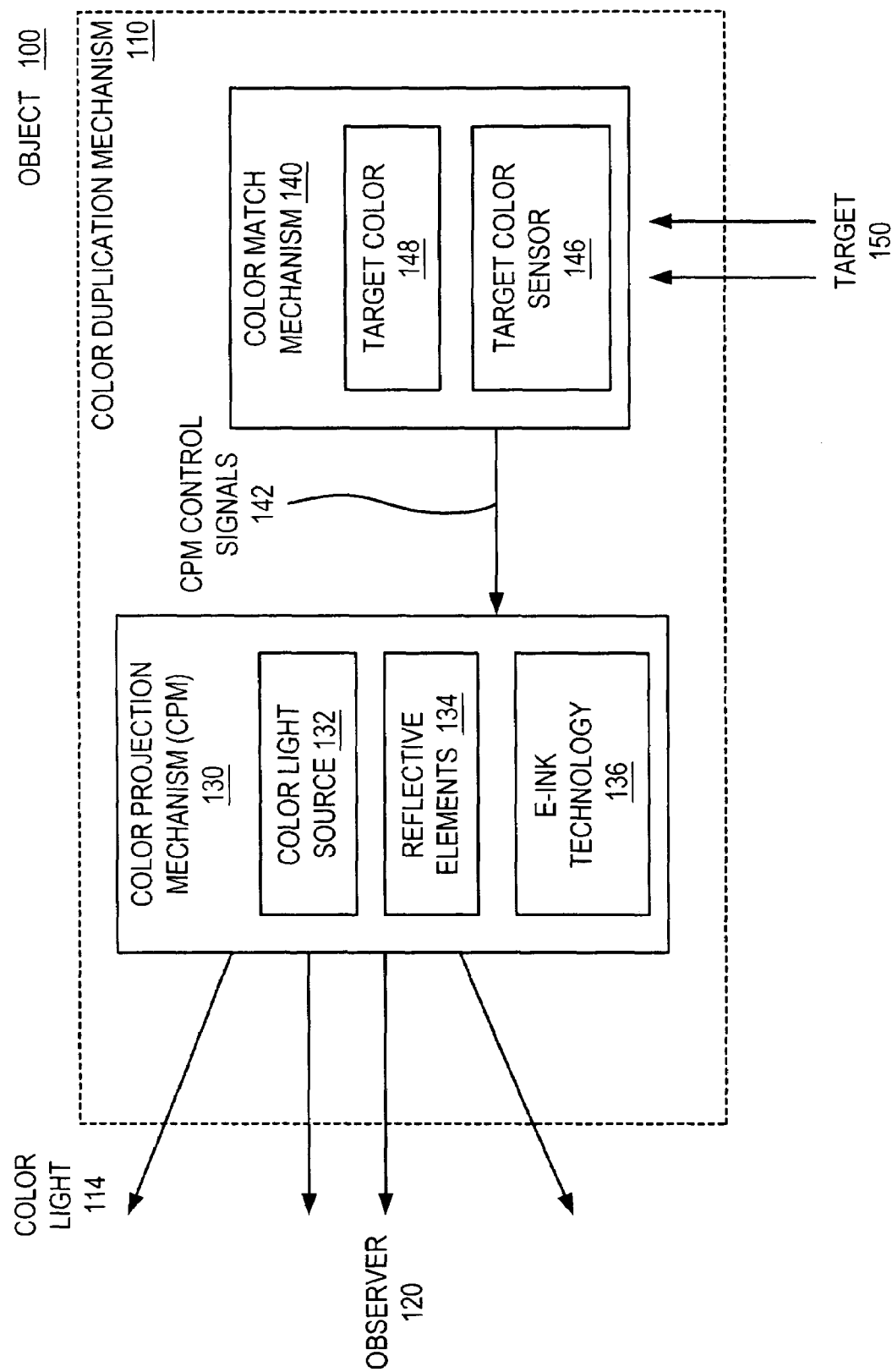
FIG. 1 illustrates an object that includes a color duplication mechanism that does not utilize feedback according to one embodiment of the invention.

FIG. 1 illustrates an object 100 that includes a color duplication mechanism 110 according to one embodiment of the invention. It is noted that the color duplication mechanism 110 according to the invention enables the object to have different colors depending on a target color 148. In this embodiment, the color duplication mechanism 110 does not utilize feedback. This embodiment is also referred to herein as an open-loop color duplication mechanism.

The color duplication mechanism 110 duplicates the target color 148 and selectively changes a color of an object to match the target color 148. The color duplication mechanism 110 includes a first color sensor 146 (also referred to herein as target color sensor) for measuring the target color 148 and a color projection mechanism 130 for selectively changing the color of the object. The color duplication mechanism 110 also includes a color matching mechanism 140 that is coupled to the first color sensor 146 for receiving the target color 148 and for controlling the color projection mechanism 130 to change the color of the object 100 to match the target color 148.

In one embodiment, the color projection mechanism 130 includes a light source for generating a light with a controllable color. In another embodiment, the color projection mechanism 130 includes reflective elements for selectively reflecting light from the object 100 to the observer 120. In yet another embodiment, the color projection mechanism 130 includes reflective elements such as E-Ink technology, which is a form of "electronic paper." E-ink technology and its use of reflective elements are described in greater detail at the website with the URL: www.e-ink.com. In yet another embodiment, the color projection mechanism 130 includes a surface that changes colors.

The color duplication mechanism 110 includes a color projection mechanism 130 and a color matching mechanism 140. The color duplication mechanism 110 generates or projects a color (e.g., color light 114) for the object 100 so that when the object 100 is seen by an observer 120, the object 110 appears to have that color.

Color light 114 is also referred herein to as the "color of the object," "projected color," or "generated light." The color duplication mechanism 110 includes a reference color 148 (which is also referred to herein as "target color 148"). The reference color 148 can be programmed into the color duplication mechanism 110 (e.g., a representation of the color the reference color may be stored in memory) or received by the color duplication mechanism 110. In the latter case, the reference color or target color 148 may be detected or "read" by a first color sensor 146 (referred to herein also as target color sensor 146). The color may be detected from a target or reference 150 (e.g., another object, the environment, or the surroundings).

The color projection mechanism 130 can be, for example, but is not limited to, a light source 132 (e.g., a multi-color light source), reflective elements 134 (e.g., mirrors), E-Ink technology 136, or a combination thereof. The light source 132 can be implemented, for example, with a combination of a white light source and a changeable color filter (e.g., a LCD projector).

When the color projection mechanism 130 employs a light source (e.g., light emitting diodes (LEDs)) to generate light, the color of the object is relatively independent of ambient illumination. However, when the color projection mechanism 130 only employs reflective elements, the color of the object is highly dependent on ambient illumination (e.g., the type of ambient light that is used to illuminate the object).

In one embodiment, the color duplication mechanism 110 duplicates the target color 148 and changes the color of the object 100 to match the target color 148. For example, the object 100 can have a color that complements or contrasts with a color in a target 150 (e.g., the color of another object, the color of a piece of clothing, a color found in the surroundings, or a color found in the environment).

In the embodiment shown in FIG. 1, the color duplication mechanism 110 is separate from the color projection mechanism 130, and the color duplication mechanism 110 controls the color projection mechanism 130 to change the color of the object (e.g., by projecting a color light with a light source, reflective elements, or E-Ink) through one or more control signals.

In an alternative embodiment, the color duplication mechanism 110 includes the color projection mechanism 130 for changing the color of the object (e.g., by projecting a color light with a light source, reflective elements, or E-Ink). For example, the color duplication mechanism 110 can be integrated with the color projection mechanism 130.

Color Duplication that Utilizes Feedback

Figure 2:
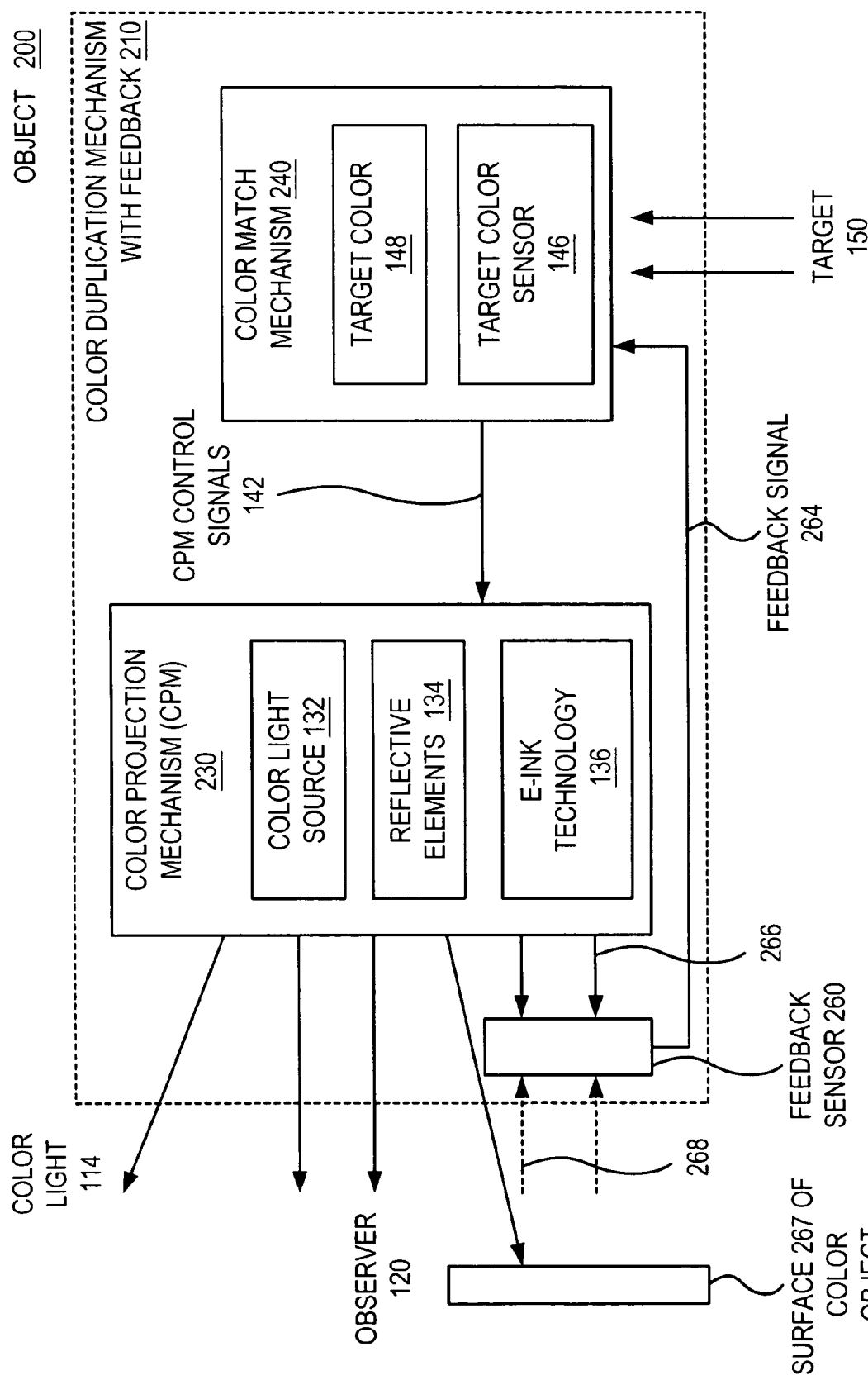
FIG. 2 illustrates an object that includes a color duplication mechanism that does utilize feedback according to another embodiment of the invention.

FIG. 2 illustrates an object 200 that includes a color duplication mechanism 210 that uses feedback according to one embodiment of the invention. In this embodiment, the color duplication mechanism 210 utilizes feedback, such as the feedback signal 264 provided by feedback sensor 260. This embodiment is also referred to herein as a closed-loop color duplication mechanism.

The components illustrated in FIG. 2 that share a common name and numeral designation function in the same manner as described previously with respect to FIG. 1. For the sake of brevity, description and operation of these common components will not be repeated herein. The components that are different from FIG. 1 are denoted with a numeral that starts with a "2" prefix.

The mechanism 210 for duplicating a target color and changing a color of an object 200 to match the target color 148 includes a first color sensor 146 (hereinafter referred to also as "target color sensor") for measuring the target color 148 of a target 150. The color duplication mechanism (CDM) 210 also includes a color projection mechanism (CPM) 230 for selectively changing the color of the object 200. The color duplication mechanism (CDM) 210 also includes a second color sensor 260 (hereinafter referred to also as "feedback color sensor") for measuring the color generated by the color projection mechanism (CPM) 230. It is noted that the feedback signal 264 can be based on the light 266 generated by the CPM 230 or based on the light 268 reflected from a color object 267. In an embodiment where the color feedback is based on light reflected from an object, even when the object has a base color (e.g., a beige color shirt), the color duplication mechanism (CDM) 210 according to the invention can change the color of the object to the desired target color.

The color duplication mechanism (CDM) 210 also includes a color matching mechanism 240 that is coupled to the first color sensor 146 and the second color sensor 260 for receiving the target color and the measured color, respectively. Based on these inputs, the color matching mechanism 240 controls the color projection mechanism 230 to change the color of the object 200 to match the target color or reference color 148. It is noted that feedback sensor 260 and the feedback signal 264, which represents that color light 114 generated by the CPM 230 make this embodiment of the color duplication mechanism (CDM) 210 according to the invention a closed-loop system.

When the CPM 130, 230 is a reflective color projection mechanism, the CPM adjusts the reflectivity of the reflective elements to varying lighting conditions (e.g., type of ambient lighting: sunlight, fluorescent light source, incandescent light source, etc.). For example, when the ambient light source changes from a fluorescent light source to and incandescent light source, the reflective color projection mechanism changes the reflectivity of the reflective elements to maintain a target color.

Color Duplication Mechanism with Controllable Filter

Figure 3:
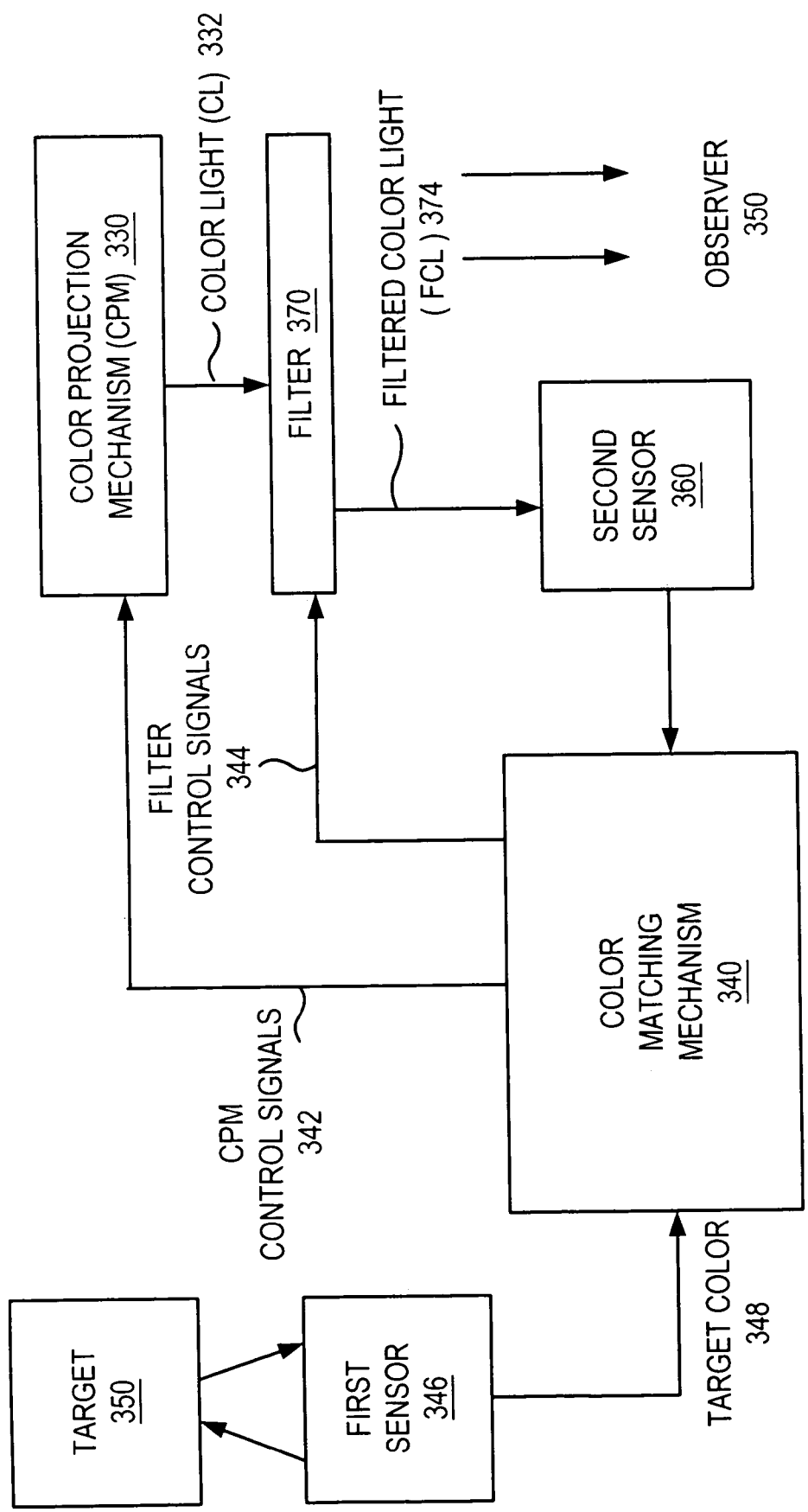
FIG. 3 is a block diagram illustrating in greater detail the color duplication mechanism of FIG. 2 according to another embodiment of the invention.

FIG. 3 is a block diagram illustrating in greater detail the color duplication mechanism 210 of FIG. 2 according to one embodiment of the invention. In this embodiment, the color duplication mechanism 210 includes a filter 370 for receiving color light 314 and generating a filtered color light (FCL) 374, which is then provided to the observer 350 and the second sensor 360.

The color matching mechanism 340 generates control signals 342 and 344 to control the color projection mechanism 330 and filter 370, respectively, to generate filtered color light 374. This embodiment of the color duplication mechanism 310 according to the invention may be useful for coloring a large area it. Generally, light sources that are of specific color (e.g., red, green, and blue light sources) are not as bright as a bright white light with a controllable filter (e.g., a LCD projector). The color duplication mechanism 310 can be utilized, for example, to color a large wall or a side or surface of a building.

Color Duplication Mechanism with Ambient Illumination Compensation

Figure 4:
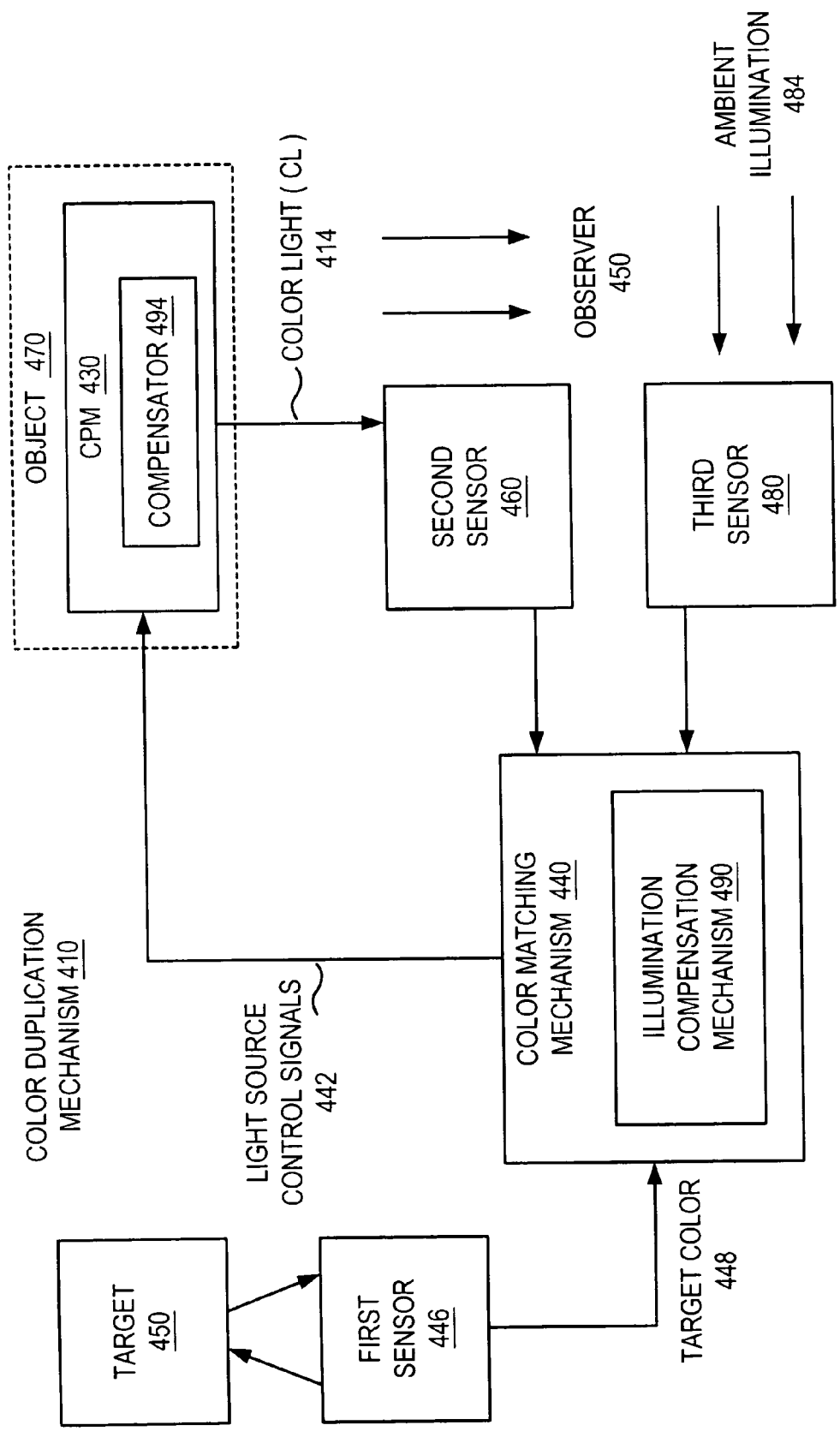
FIG. 4 is a block diagram illustrating in greater detail the color duplication mechanism of FIG. 2 according to yet another embodiment of the invention.

FIG. 4 is a block diagram illustrating in greater detail the color duplication mechanism 210 of FIG. 2 according to yet another embodiment of the invention. In this embodiment, the color duplication mechanism includes a third sensor 480 (also referred to herein as an ambient illumination sensor) for measuring or detecting the ambient illumination 484. The color duplication mechanism 210 also includes a color matching mechanism 440 that includes an illumination compensation mechanism 490 that is coupled to the third sensor 480. The color projection mechanism 430 also includes a light compensator 494 for selectively modifying the color light (CL)

414. Based on the signals received from the third sensor 480 representative of current ambient illumination, the illumination compensation mechanism 490 selectively controls light compensator (hereinafter referred to also as compensator 494) so that the color perceived by the observer 450 does not depend on changing ambient illumination.

By measuring the light reflected from the object, the color duplication mechanism according to the invention changes an object's color so that the reflected color appears to the same to the human eye even under different illumination.

In this embodiment, the color projection mechanism and the light compensator 494 can be implemented with E-Ink technology. It is noted that color projection mechanism according to the invention can include a combination of light sources, reflective elements, and E-Ink technology.

Processing

Figure 5:
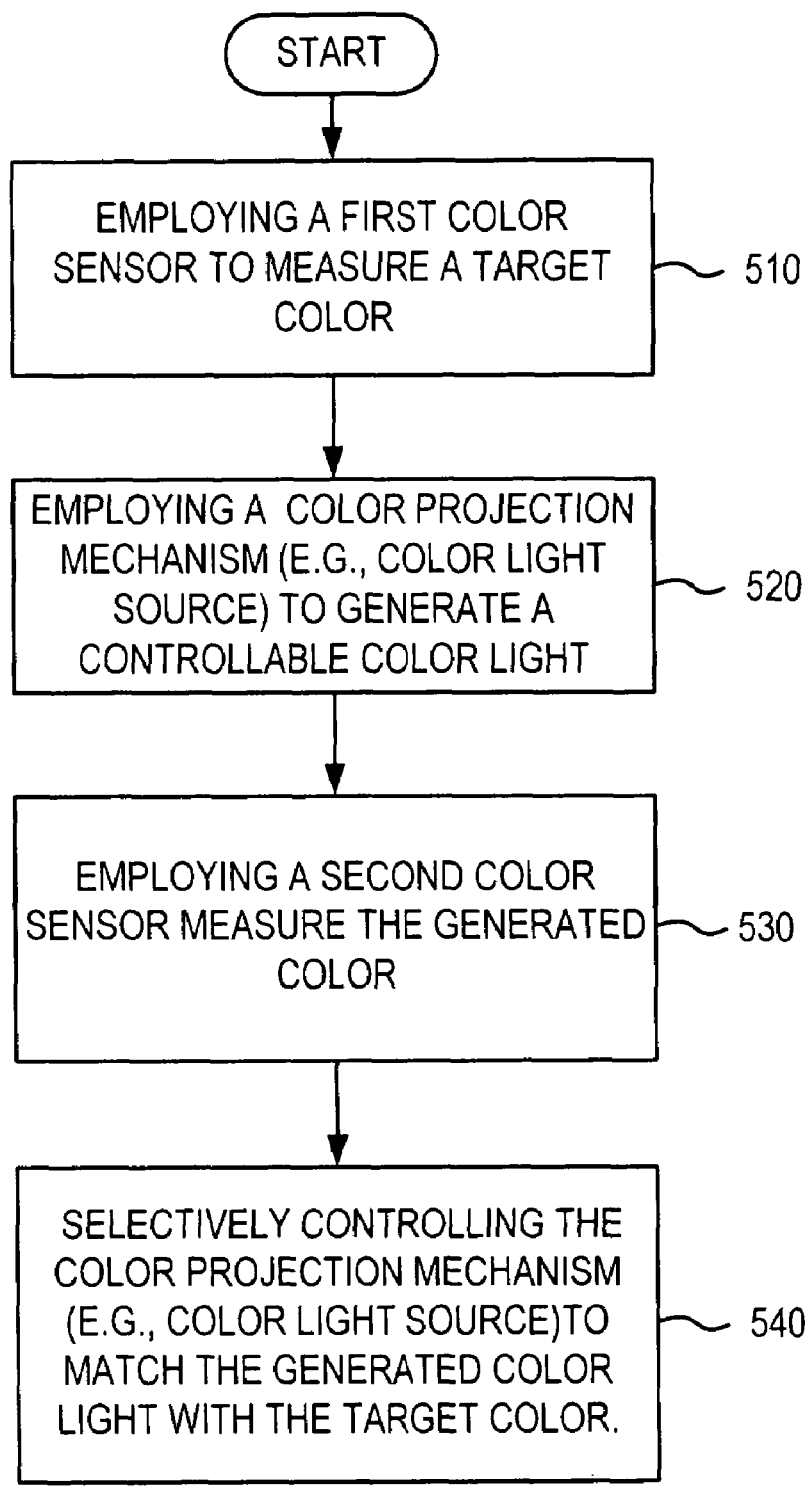
FIG. 5 is a flow chart illustrating the processing steps performed by the color duplication mechanism according to one embodiment of the invention.

FIG. 5 is a flow chart illustrating the processing steps performed by the color duplication mechanism according to one embodiment of the invention. In step 510, a target color is measured. For example, a first color sensor can be utilized for measuring the target color. In step 520, a color projection mechanism is utilized to generate a color for an object. As described previously, the color of the object can be generated by utilizing a color projection mechanism, such as a color light source, reflective elements, E-Ink technology, or a combination thereof.

In step 530, the color generated in step 520 is measured. A second color sensor can be utilized for measuring the generated color (e.g., the color viewed by the observer). For a system that does not utilize feedback, this step may be omitted.

In step 540, based on the target color and the generated color, the color projection mechanism is selectively controlled to match the color of the object (e.g., projected color) to the target color. When the color duplication mechanism according to the invention includes the color projection mechanism, the color duplication mechanism utilizes one or more optical elements (e.g., a light source, reflective elements, E-Ink technologies) to change the color of the object as seen by an observer.

When the color duplication mechanism according to the invention does not includes the color projection mechanism, step 540 can include the step of generating control signals for controlling the color projection mechanism 260 to selectively change the color of the light projected or generated by the color projection mechanism 260. When the color projection mechanism 260 is implemented with a light source that includes multi-color LEDs, step 540 can include, for example, the step of generating drive signals for a red LED, green LED, and a blue LED.

In one embodiment, feedback from a feedback sensor is not utilized. In this case, step 530 is omitted, and step 540 is modified to recite, "selectively controlling the color projection mechanism (e.g., color light source) to generate or project a color light that matches with the target color." It is noted that step 540 is not dependent on or based upon a measured color or feedback.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. An apparatus for duplicating a target color and changing a color of an object to match the target color comprising:
   a) a first color sensor to measure the target color;
   b) a color projection mechanism to selectively change the color of the object;
   c) a second color sensor to measure the color generated by the color projection mechanism; and
   d) a color matching mechanism coupled to the first color sensor and the second color sensor to receive the target color and the measured color and to control the color projection mechanism to change the color of the object to match the target color.

2. The apparatus of claim 1 wherein the color projection mechanism includes a light source to generate a light with a controllable color.

3. The apparatus of claim 1 wherein the color projection mechanism includes reflective elements to selectively reflect light from the object to an observer.

4. The apparatus of claim 1 wherein the color projection mechanism includes a light source to generate a light with a controllable color and reflective elements to selectively reflect light from the object to an observer.

5. The apparatus of claim 1 wherein the color projection mechanism includes reflective technology.

6. The apparatus of claim 1 wherein the apparatus duplicates one of a target color of a second object, a target color of a piece of clothing, and a target color found in an environment and surrounding and changes the color of the object to the target color.

7. A method for changing a color of an object to match a target color using an apparatus comprising a first color sensor configured to measure the target color, a color projection mechanism configured to project colored light therefrom, and a second color sensor configured to measure the colored light projected by the color projection mechanism, the method comprising:
   measuring the target color with the first color sensor;
   measuring the colored light projected by the color projection mechanism with the second color sensor, and
   selectively changing the color of the object to match the target color with the colored light projected from the color projection mechanism, the color of the object being changed and matched on the basis of a combination of: (a) the target color measured by the first color sensor, and (b) the colored light measured by the second color sensor.

8. The method of claim 7, wherein selectively changing the color of the object further comprises:
   selectively changing the color of the object by utilizing reflective elements.

9. The method of claim 7, wherein selectively changing the color of the object further comprises:
   selectively changing the color of the object by utilizing E-Ink technology.

10. The method of claim 7, wherein selectively changing the color of the object to match the target color includes periodically measuring the target color and using the measured target color as feedback to control the colored light and the color of the object.

* * * * *